(12) United States Patent
Roca Vila et al.

(10) Patent No.: US 11,833,758 B2
(45) Date of Patent: Dec. 5, 2023

(54) SUBMITTING 3D OBJECT MODELS FOR 3D PRINTING HAVING STORED DIGITAL MODEL IN A 3D PRINT FILE AS AN INTEGERIZED TRIANGLE MESH

(71) Applicant: Hewlett-Packard Development Company, L.P., Spring, TX (US)

(72) Inventors: Jordi Roca Vila, Sant Cugat del Valles (ES); Sergio Gonzalez Martin, Sant Cugat del Valles (ES); Jordi Sanroma Garrit, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 291 days.

(21) Appl. No.: 17/246,051

(22) Filed: Apr. 30, 2021

(65) Prior Publication Data

US 2022/0363005 A1 Nov. 17, 2022

(51) Int. Cl.
*B29C 64/393* (2017.01)
*B29C 64/386* (2017.01)
*G06T 17/20* (2006.01)
*B33Y 10/00* (2015.01)
*B33Y 50/00* (2015.01)

(52) U.S. Cl.
CPC ............ *B29C 64/386* (2017.08); *B33Y 10/00* (2014.12); *B33Y 50/00* (2014.12); *G06T 17/20* (2013.01); *G06T 2210/12* (2013.01)

(58) Field of Classification Search
CPC ................................................... B29C 64/393
See application file for complete search history.

(56) References Cited

U.S. PATENT DOCUMENTS 5,059,359 A * 10/1991 Hull ........................ B33Y 10/00
118/620
5,137,662 A * 8/1992 Hull ...................... G01J 1/4257
118/712
2018/0086003 A1* 3/2018 Greene .................. B33Y 50/02
2021/0205887 A1* 7/2021 Huang ................ B29C 33/3842
2021/0407197 A1* 12/2021 Gonzalez Martin .... G06T 17/00

* cited by examiner

*Primary Examiner* — Suresh Suryawanshi
(74) *Attorney, Agent, or Firm* — Michael Dryja

(57) ABSTRACT

In an example implementation, a method of submitting 3D object models to a 3D printing system includes receiving a digital object model as a triangle mesh, and integerizing floating-point X, Y, Z, coordinate values of triangle vertices that define triangles of the triangle mesh. The method includes storing the digital object model in a 3D print file as an integerized triangle mesh comprising the integerized X, Y, Z, coordinate values, and then submitting the 3D print file with the integerized triangle mesh to the 3D printing system to produce the 3D object.

12 Claims, 4 Drawing Sheets

SUBMITTING 3D OBJECT MODELS FOR 3D PRINTING HAVING STORED DIGITAL MODEL IN A 3D PRINT FILE AS AN INTEGERIZED TRIANGLE MESH

BACKGROUND

Additive manufacturing processes can make three-dimensional (3D) objects from digital 3D object models. During such processes, a digital object model file containing a 3D object model representation can be unpacked and stored into a storage area. Thereafter, the stored information representing the 3D object model can be processed from the storage area to produce a 3D object. In some examples, data from a digital 3D object model can be processed into slices that define areas of build material layers that are to be formed into an object. An object can be formed when the defined areas of build material are solidified according to the 3D object model. For example, in some 3D printing processes, inkjet printheads can selectively print (i.e., deposit) liquid functional agents, such as fusing agents or liquid binding agents, onto defined areas of build material within build layers that are to become layers of a 3D object. Energy can be applied to each build layer and the printed areas of build material can coalesce and solidify upon cooling.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
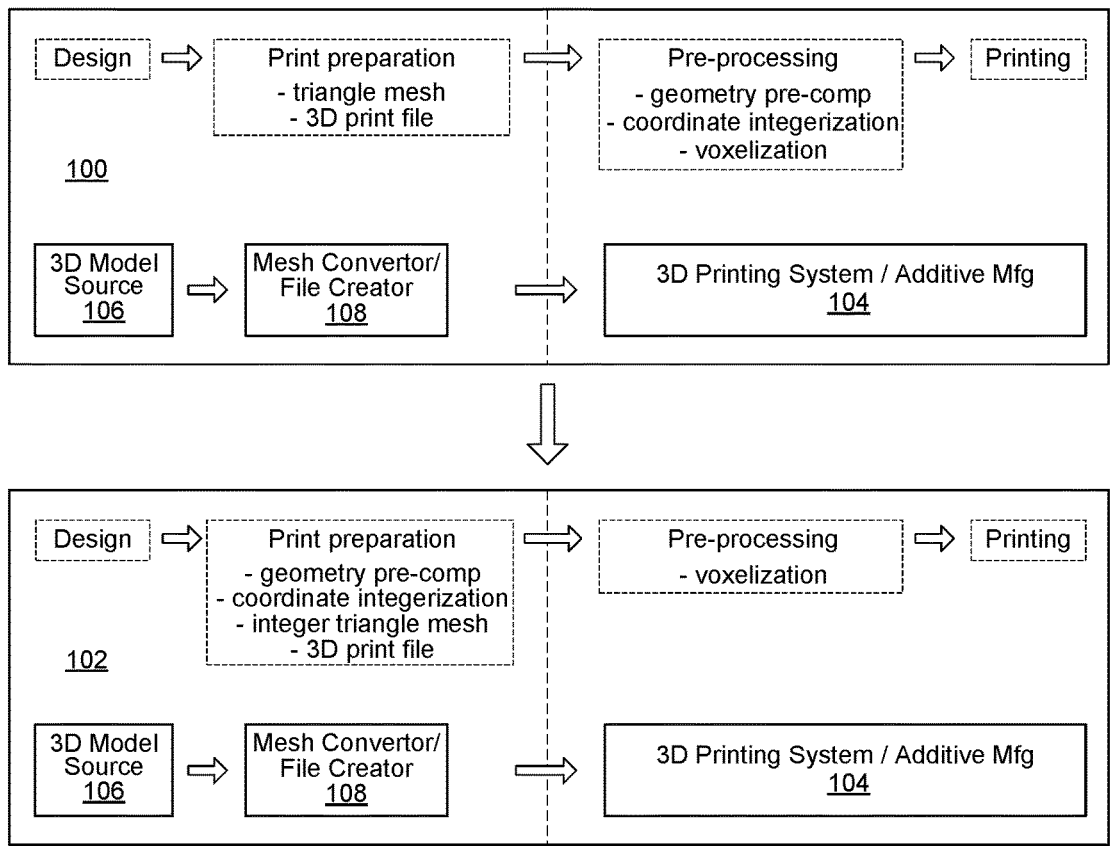
FIG. 1 shows block diagram representations of example digital data pipelines for the generation of digital 3D models.

Jobs submitted to 3D printing systems or other additive manufacturing systems are submitted as 3D model files, also referred to as 3D print files. A 3D print file can contain a large number of digital 3D object models customized with complex geometries and specifications. Such large and complex 3D print jobs/files present challenges that can reduce the efficiency of both the job submission and the job processing in such systems.

Before a physical object is generated in a 3D printing system or other additive manufacturing system, data that represents the physical object is generated and processed through what can be referred to as a data pipeline. The data pipeline begins at a source, where a digital 3D model is generated. For example, a digital 3D model can be generated on a CAD (computer aided design) system, or by a scanner that scans an object, or by some other imaging device that images an object. A digital 3D model from a source is converted into a triangle mesh that represents the 3D model. The conversion of the 3D model to a triangle mesh can occur at the source or somewhere later along the data pipeline. The triangles in a triangle mesh are formed by connecting data points that have been rendered on Cartesian coordinates (X, Y, and Z planes). The data points serve as the vertices of the triangles, and connecting each of the triangle vertices to its nearest neighbors forms the 3D model as a triangular mesh.

A 3D print file (i.e., 3D model file, 3D print job) is a type of container that contains 3D printing data such as the triangular meshes that represent 3D models. A 3D print file can be created by saving or enclosing triangular meshes within the file. Examples of 3D print files include 3MF (3D Manufacturing Format) and STL (Standard Triangle Language" and "Standard Tessellation Language) files. For each 3D model to be represented in a 3D print file, a triangular mesh is saved as an indexed list of the vertices that form each triangle within the mesh. Associated with each indexed vertex in the list, are the three X, Y, and Z coordinate values that specify the position of the vertex within the mesh. In addition to an indexed list of vertices, each 3D model in a 3D print file includes a list of the triangles that make up the triangular mesh for that 3D model. Each triangle in the list of triangles is expressed as a set of the three vertices that make up that triangle. The vertices for each triangle can be identified by use of their index number in the indexed list of vertices.

After a 3D print file is formed or saved in this manner, it can be submitted to a 3D printing system or other additive manufacturing system for processing and subsequent generation of the physical object or objects within the file. Therefore, prior to an object being generated by a 3D printing system or other additive manufacturing system from a 3D print file, the system performs pre-processing of the 3D print file. The pre-processing operations generally include, for each 3D model within the 3D print file, mapping the space of the 3D model triangular mesh to the origin of the 3D printing system's build space, and then "voxelizing" the triangular mesh data. Voxelizing the triangular mesh data translates the data points of each triangular mesh to points within a volume on a 3D grid which enables the 3D printing system to determine how to create an object. For example, in some 3D printing systems the voxelized data enables the system to determine how to spread layers of build powder onto a build platform, which locations on the powder layers to print a fusing agent, and how to apply fusing energy to the printed layers.

The pre-processing of a 3D print file can depend in part on the structure of the 3D print file and the processing system used by the 3D printing system. For example, performing the pre-printing or pre-manufacturing processing can include storing the uncompressed content from the file. The uncompressed content can comprise large amounts of data that consumes significant storage space within the system. In addition, submitting, storing, and processing such large amounts of data on the system can take substantial amounts of time, which results in an inefficient use of the 3D printing system.

The size of the 3D print file submitted to a 3D printing system is therefore an important factor that affects the amount of time and storage space used when submitting and pre-processing a 3D print file. As noted above, the size of a 3D print file increases when the number and complexity of the 3D models in the file increase. Much of the size of a 3D print file can be attributed to the data that represents the X, Y, and Z coordinate values that specify the positions of the many triangle vertices in the triangular mesh, or meshes. The vertices coordinate values are expressed as Real numbers stored in floating-point representation. Therefore, each X, Y, and Z coordinate value represented as a floating-point number includes numerous digits to the right of the decimal point. The large amount of data used to store the many triangle vertices coordinate values within a 3D printing file can cause the 3D print file to be, very large, on the order of gigabytes in size. The submission and processing of such large 3D print files (i.e., jobs) on 3D printing systems or other additive manufacturing systems can tie up such systems for long periods of time and significantly reduce their efficiency.

Accordingly, example methods and systems are discussed herein for reducing the size of 3D print files submitted to, and processed by, 3D printing systems and other additive manufacturing systems. Reducing the size of 3D print files before they are submitted to the 3D printing system reduces the system processing time and enables faster production of 3D objects represented in the 3D print files. The example methods enable the submission of reduced 3D print file sizes by moving part of a voxelization process to an earlier point within the data pipeline. An "integerization" or "discretization" step in the voxelization process that would previously have been performed by the 3D printing system can now be performed prior to submitting the 3D print file to the 3D printing system. The integerization step involves rounding the triangle vertices coordinate values expressed as Real floating-point numbers to their nearest integer number. Therefore, all the digits to the right of the decimal point for the X, Y, and Z coordinate floating-point numbers, for all of the many triangle vertices in the 3D model triangular meshes within a 3D print file, can be eliminated by rounding each coordinate value to its next closest integer value. Consequently, the amount of data used to represent the triangle vertices coordinate values can be significantly reduced, which results in a smaller 3D print file being submitted to the 3D printing system. Moving the integerization step (i.e., rounding triangle vertices coordinate values) to an earlier point in the data pipeline does not impact the dimensions of the resulting printed object because this same integerization step would otherwise have been performed by the 3D printing system. Furthermore, in some examples the rounded/integerized values of the triangle vertices coordinates can provide a higher resolution and/or sufficient resolution that exceeds or is close enough to the resolution of the 3D printing system that there is no effect on the dimensions of the printed object. This is in part due to the subsequent voxelization operation that translates the triangle mesh data of the triangle vertices coordinates into points within a volume on a 3D grid, as discussed below.

In a particular example, a method of submitting 3D object models to a 3D printing system or other additive manufacturing system includes receiving a digital object model represented as a triangle mesh, where the digital object model represents a 3D object to be produced by the 3D printing system. The method includes integerizing (i.e., converting into integers) floating-point X, Y, Z, coordinate values of triangle vertices that define triangles of the triangle mesh. The method then stores the digital object model in a 3D print file as an integerized triangle mesh comprising the integerized X, Y, Z, coordinate values. The 3D print file with the integerized triangle mesh is then submitted to the 3D printing system to produce the 3D object.

In another example, a method of producing a 3D print file for submission to a 3D printing system includes receiving a digital object model from a 3D object model source. The digital object model is transformed into a mesh of triangles, where the triangles are defined by triangle vertices X, Y, Z, coordinates expressed as floating-point numbers. The method includes integerizing the floating-point numbers before submitting the mesh of tringles to a 3D printing system, and saving integerized triangle vertices X, Y, Z, coordinates in a 3D print file so that the digital object model is represented as a mesh of triangles defined by integerized triangle vertices X, Y, Z, coordinates expressed as integer numbers.

In another example, a method of preparing a 3D digital object model for printing on a 3D printing system includes generating a 3D digital model on a source device, and converting the 3D digital model on the source device into a triangle mesh defined by triangle vertices. The method includes integerizing, on the source device, the triangle vertices coordinates that make up the triangle mesh and that are represented in floating-point numbers. The method then includes saving a 3D print file that contains the triangle mesh with the integer triangle vertices coordinates. In some examples, the 3D print file is then submitted to a 3D printing system for producing an object based on the 3D model.

FIG. 1 shows block diagram representations of example digital data pipelines for the generation of digital 3D models, and for the submission of such 3D models to 3D printing systems and other additive manufacturing systems for the production of 3D objects. In FIG. 1, both a current digital pipeline 100, and a new digital pipeline 102, are shown. While some operations within the current and new digital data pipelines 100, 102, for generating and processing digital 3D models are the same, there are some specific differences in the new digital data pipeline 102 as discussed herein. The differences in the new digital data pipeline 102 provide for smaller sized 3D print files being submitted to a 3D printing system 104, which reduces the system processing time and enables faster production of 3D objects.

Referring to the current and new digital pipelines 100, 102, a 3D model source 106 can comprise the beginning of the pipeline. A 3D model source 106 is a device or process where a 3D digital model is designed or created, or where it originates. For example, a 3D model source 106 can include a scanner that scans an object and records measurements as data points that represent the digital 3D object model as a point cloud. Another example of a 3D model source 106 is a CAD (computer-aided design) system. CAD systems can aid in the design and creation of digital 3D object models, depicting them as vector-based graphics or raster graphics, for example.

After a 3D digital model is created at a source 106, prior to submitting the 3D model to the 3D printing system 104 for printing, the 3D digital model is prepared for printing. Print preparation includes converting the 3D digital model into a triangle mesh and saving it as a triangle mesh into a 3D print file. During print preparation, multiple 3D digital models can be converted into triangle meshes and saved into a 3D print file. Thus, a 3D print file can contain numerous 3D object model triangle meshes. The 3D print file can comprise, for example, an STL file, a 3MF file, or a file in another format suitable for containing a 3D digital model as a triangle mesh. Converting a 3D digital model into a triangle mesh and saving the 3D digital model as a triangle mesh which creates a 3D print file, are print preparation operations that can occur on a computing device 108, such as a mesh convertor/file creator computing device 108, as shown in FIG. 1. The computing device 108 shown in FIG. 1 is intended to represent computer hardware and/or software that can process a 3D digital model to convert it into a triangle mesh and then create a 3D print file by saving the 3D digital model as a triangle mesh into the 3D print file. In some examples, however, these mesh conversion and 3D print file creation processes can occur at the source device 106. That is, the hardware and/or software shown as computing device 108 in FIG. 1 may in some examples be part of a source device 106. For example, a scanner 106 can create a point cloud representing a scanned object, convert the data points of the point cloud into the vertices of a triangle mesh, and then output the triangle mesh as a 3D print file, such as a 3MF file. Similarly, in some examples a 3D digital model designed on a CAD system 106 can be converted to a triangle mesh representation and then output or saved from the CAD system 106 as a 3D print file, such as a 3MF file. Furthermore, in some examples, a source device 106 such as a CAD system 106 can process the triangle mesh and convert the triangle vertices coordinates from their floating-point number representations into integers. That is, a source device 106 can generate a 3D digital model and convert the model into a triangle mesh representation where the triangle vertices coordinates are floating-point numbers. The source device 106 can then integerize the triangle vertices coordinates by rounding the floating-point numbers to their next nearest integer values. The source device 106 can then save and output the 3D print file having a reduced data size with integerized triangle meshes.

As shown in the current digital pipeline 100 of FIG. 1, a 3D print file can be submitted to a 3D printing system 104 where pre-processing operations are performed by the 3D printing system 104. By contrast, as shown in the new digital pipeline 102 of FIG. 1, some of these pre-processing operations are moved upward to be performed at an earlier point within the digital pipeline 102. This enables the pre-processing operations to be performed by a computing device 108 during print preparation instead of being performed on the 3D printing system 104. The pre-processing operations that can be performed prior to submitting a 3D print file to the 3D printing system 104, as shown in the new digital pipeline 102 of FIG. 1, include geometry pre-compensation operations and triangle vertices coordinate integerization operations. As discussed in more detail below, the geometry pre-compensation operation provides a mapping defined by a translation that moves the bounding box origin of a 3D digital model to the 3D printing system's build origin. The integerization operation provides a rounding function that converts triangle vertices coordinate values from floating-point numbers having digits to the right of the decimal, into integers having no digits to the right of the decimal. The voxelization operation is not moved in the digital pipeline, but instead it remains for pre-processing on the 3D printing system 104. The voxelization operation provides a triangle mesh data translation of the triangle vertices coordinates to points within a volume on a 3D grid which enables the 3D printing system 104 to determine how to create a physical object from the triangle mesh 3D model. In some example 3D printing systems, the voxelized data enables the system to determine how to spread layers of build powder onto a build platform, which locations on the powder layers to print a fusing agent, and how to apply fusing energy to the printed layers.

Figure 2:
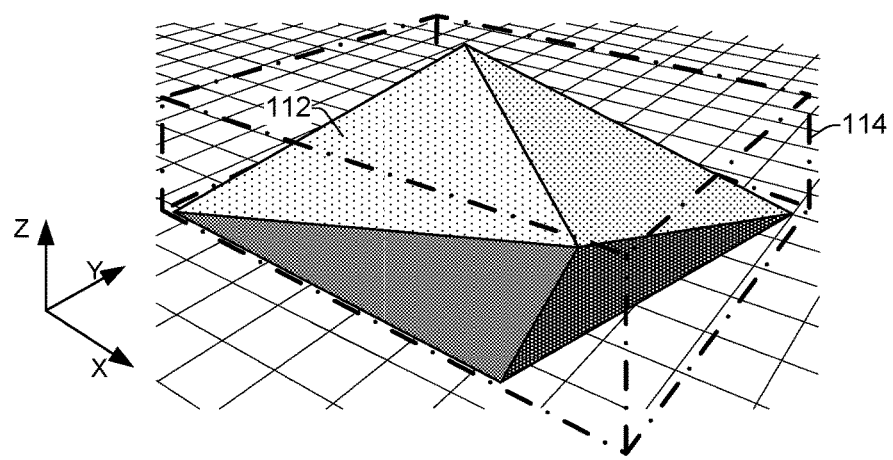
FIG. 2 shows an example of a 3D object model that can be defined or located within a bounding box in X, Y, Z, coordinate space.

As noted above, the size of a 3D print file is an important factor that affects the amount of time and storage space used by a 3D printing system when submitting and pre-processing a 3D print file. Accordingly, a method is presented herein that is applicable to reduce the size of a 3D print file in which 3D object models are to be contained and submitted to a 3D printing system 104. FIG. 2 shows an example of a 3D object model 112 that can be defined or located within a bounding box in X, Y, Z, coordinate space. For example, a bounding box 114 encompassing the 3D object model 112 of FIG. 2 may be 50 mm in the X dimension, by 40 mm in the Y dimension, by 30 mm in the Z dimension. A given digital 3D object model (k), such as 3D object model 112, can be expressed as a triangular mesh which is described as a set of triangle vertices (p) and faces as in the following expression:

$$M_k = \{\{p_i^k \in \mathbb{R}^3 \text{ where } i \leq N \in \mathbb{N}\} \text{ and } \{v_j^k \in \mathbb{Z}^3 \text{ where } j \leq M \in \mathbb{N}\}\}$$

Referring to FIG. 2, a method for reducing the size of a 3D print file in which 3D object models are to be contained and submitted to a 3D printing system 104 includes first and second operations. In a first operation, a selected digital 3D object model such as 3D object model 112 is translated into the 3D coordinate space of the 3D printing system's origin. In the first operation, a mapping is defined by a translation that moves the digital bounding box origin to the 3D printing system's build origin, as described by the following expression:

$$t_k = (t_1, t_2, t_3) \in \mathbb{R}^3 \text{ where } t_i = \min_j \{\|p_j^k\|_2\} \text{ and } i = \{1, 2, 3\}$$

$$\mathcal{F}_1^k(p) = p - t_k$$

In this expression, for each given digital 3D object model (k), a translation (t) is computed that moves all the triangle vertices (p) to corresponding positions relative to the 3D coordinate space of the 3D printing system's origin. The translation (t) for each model (k) is calculated based on the minimum value of the triangle vertices (p) (i.e., the vertex/point closest to the bounding box origin), and it is then applied to each vertex point (p) by subtracting it from each vertex point.

Figures 3, 4, 5A:
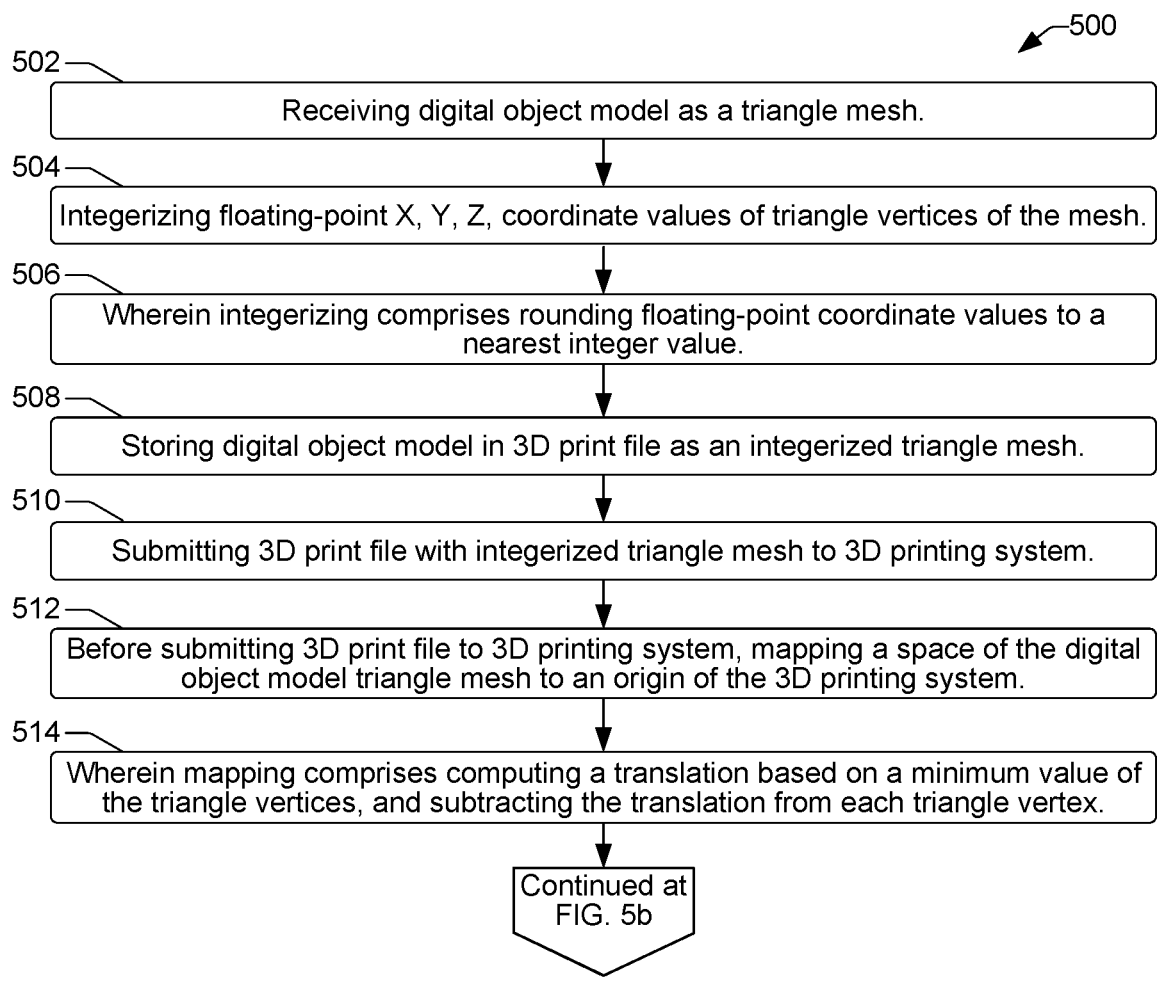
FIG. 3 shows an example of a partial list of triangle vertices coordinates stored as real numbers in floating-point within a 3D printing file.
FIG. 4 shows an example of the triangle vertices coordinate values of FIG. 3 after they have been translated into the 3D coordinate space of the 3D printing system's origin and rounded to their nearest respective integer values.
FIGS. 5a, 5b, are flow diagrams showing example methods of submitting 3D object models to a 3D printing system or other additive manufacturing system.

In a second operation, the method performs part of a voxelization process in which the triangle vertices coordinates for each triangle mesh 3D object model are "discretized" or "integerized". When a 3D object model is converted into a triangle mesh as discussed above with reference to FIG. 1, the X, Y, Z, coordinate values for the triangle vertices are expressed as Real numbers stored in floating-point representation. Therefore, each X, Y, and Z coordinate value represented as a floating-point number includes numerous digits to the right of the decimal point. FIG. 3 shows an example of a partial list of triangle vertices coordinates stored as real numbers in floating-point within a 3D printing file. In the second operation of the method, referred to alternately as integerization or discretization, the X, Y, Z, triangle vertices coordinates represented as floating-point real numbers, are rounded to their nearest integer values according to the following expression:

$$\mathcal{F}_2^k(p) = \mathcal{R}\left(\frac{p_1}{r_1}, \frac{p_2}{r_2}, \frac{p_3}{r_3}\right) \in \mathbb{Z}^3$$

where $r_i$ is the resolution of the 3D printing system for each dimension i, and R is rounding the operator toward the nearest integer.

The resolution ri in each dimension can be considered a voxel resolution, where a voxel represents a value in 3D space defined by X, Y, and Z dimensions. Some 3D printing systems process 3D model data into 2D data slices that define areas of build layers that are to be formed into an object. Processing 3D model data into 2D data slices includes further "voxelizing" the 3D model triangular mesh data. Voxelizing the triangular mesh data translates the data points of each triangular mesh to points within a volume on a 3D grid. In some example 3D printing systems, the resolution ri in each dimension (i.e., X, Y, Z) can vary so that voxels in such systems are not cuboidal. For example, a 3D system may have equal resolution in the X and Y dimensions, but a different resolution in the Z dimension. Voxels printed in such systems can be square at either end but have an elongated Z dimension. Object layers are formed by spreading build material (e.g., powder) over a build platform with the layers having a thickness in the Z dimension. Liquid fusing or binding agents can then be selectively applied (i.e., printed) onto the layers in the planar X and Y dimensions to define what areas of each layer will become part of the object. The thickness of each layer can be determined by the resolution with which the 3D printing system is capable of spreading build material in the Z dimension. The application of liquid agents onto the build material layers is determined by the resolution with which the 3D printing system is capable of moving inkjet printheads in both the X and Y dimensions to selectively print (i.e., deposit) droplets of liquid agent onto the build material layers. Thus, a minimum voxel location can be determined, or created, according to the resolution ri of the 3D printing system for each dimension i (i.e., X, Y, Z).

The rounding operation noted above eliminates the digits to the right of the decimal points for all triangle vertices coordinate values representing the vertices for each 3D object model triangle mesh. FIG. 4 shows an example of the triangle vertices coordinate values of FIG. 3 after they have been translated into the 3D coordinate space of the 3D printing system's origin in the first operation, and after they have been rounded to their nearest respective integer values in the second operation.

Both of the expressions above representing the two described method operations can be combined in the following function:

$$\mathcal{F}^k = \mathcal{F}_2^k(\mathcal{F}_1^k(p)) \text{ when } p \in M_k \text{ and } k \in \mathbb{N}$$

Referring again now to the digital data pipelines 100, 102, of FIG. 1, in a new digital pipeline 102, some pre-processing operations discussed above that have previously been performed on a 3D printing system 104, can be moved upward in the pipeline 102 to be performed at an earlier point within the pipeline 102 before a 3D print file is submitted to the 3D printing system 104. The first pre-processing operation (geometry pre-compensation) translates a 3D object model into the 3D coordinate space of the 3D printing system's origin, and the second pre-processing operation of integerizes the triangle vertices coordinates. These operations are performed in the new digital pipeline 102 by a computing device 108 during print preparation of a 3D print file. The 3D print file created by a computing device 108 during print preparation is therefore reduced in size, because it contains 3D object model triangle meshes whose triangle vertices coordinates have been integerized and translated to the 3D printing system's origin space. The 3D print file which comprises an integerized triangle mesh, or multiple integerized triangle meshes, can then be submitted to the 3D printing system 104 or other additive manufacturing system to produce a 3D object or objects.

FIGS. 5 (i.e., 5a, 5b), 6, and 7, are flow diagrams showing example methods 500, 600, and 700, of submitting 3D object models to a 3D printing system or other additive manufacturing system. Methods 500, 600, and 700 are associated with examples discussed above with reference to FIGS. 1-4, and details of the operations shown in methods 500, 600, and 700 can be found in the related discussion of such examples. The operations of methods 500, 600, and 700 may be embodied as programming instructions stored on a non-transitory, machine-readable (e.g., computer/processor-readable) medium, such as memory/storage 814 shown in FIG. 8, or on the memories of a source device 106 and computer device 108 as shown in FIG. 1. In some examples, implementing the operations of methods 500, 600, and 700 can be achieved by a controller, such as a controller 810 of FIG. 8, or other controllers of a source device 106 and computer device 108 as shown in FIG. 1, that can read and execute programming instructions stored in a memory. In some examples, implementing the operations of methods 500, 600, and 700 can be achieved using an ASIC and/or other hardware components alone or in combination with programming instructions executable by a controller.

Figure 5B:
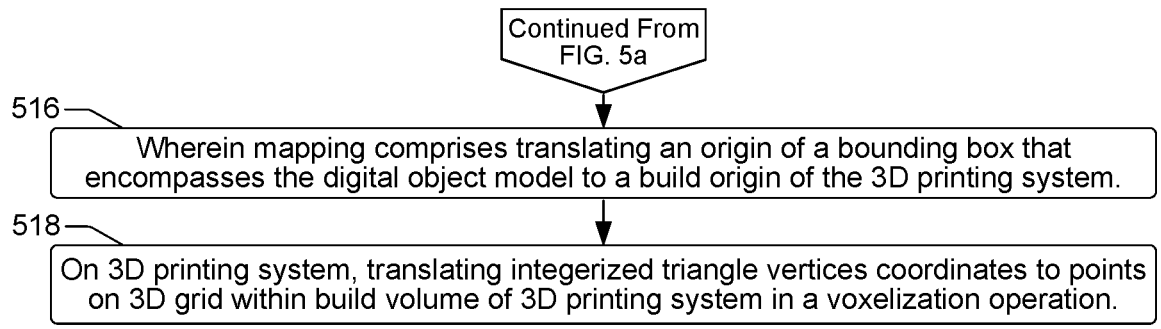
Figure 6:
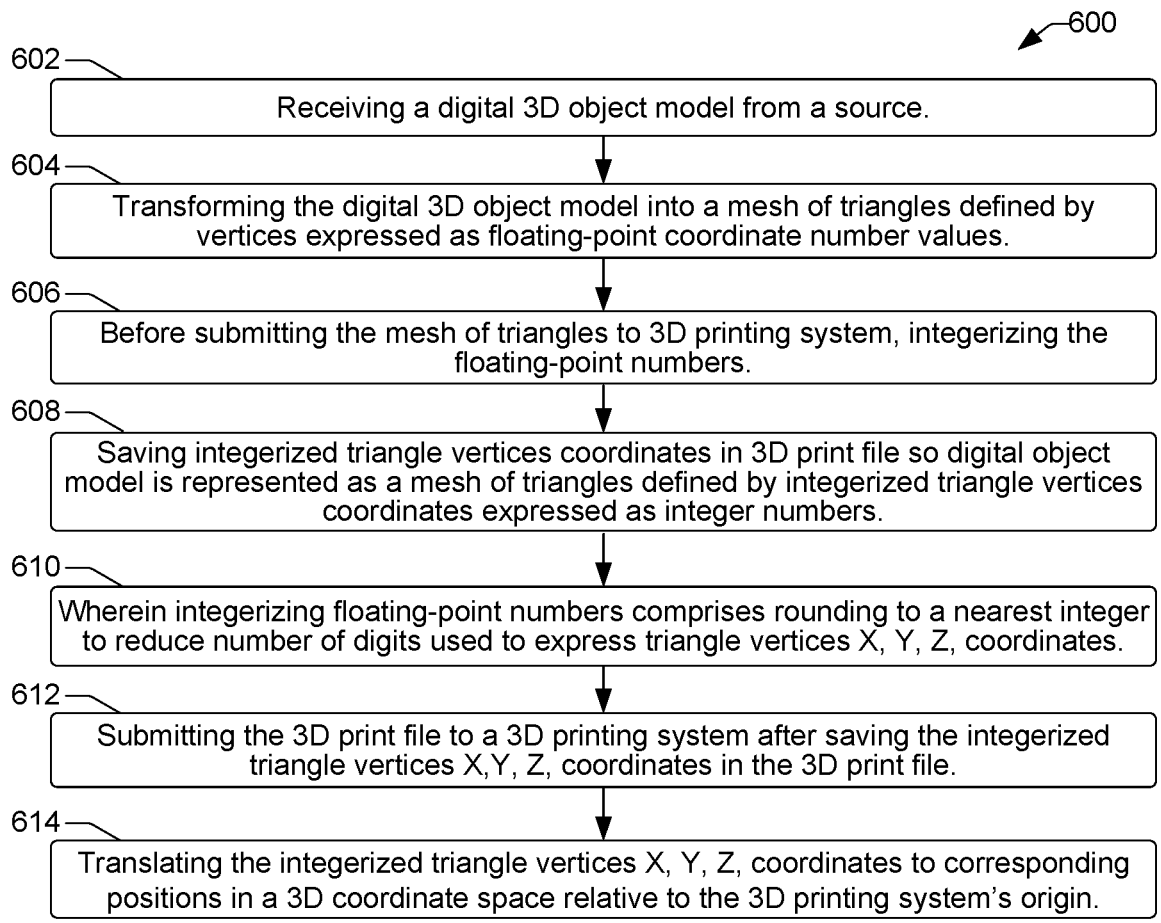
FIG. 6 is a flow diagram showing an example method of producing a 3D print file for submission to a 3D printing system.
Figure 7:
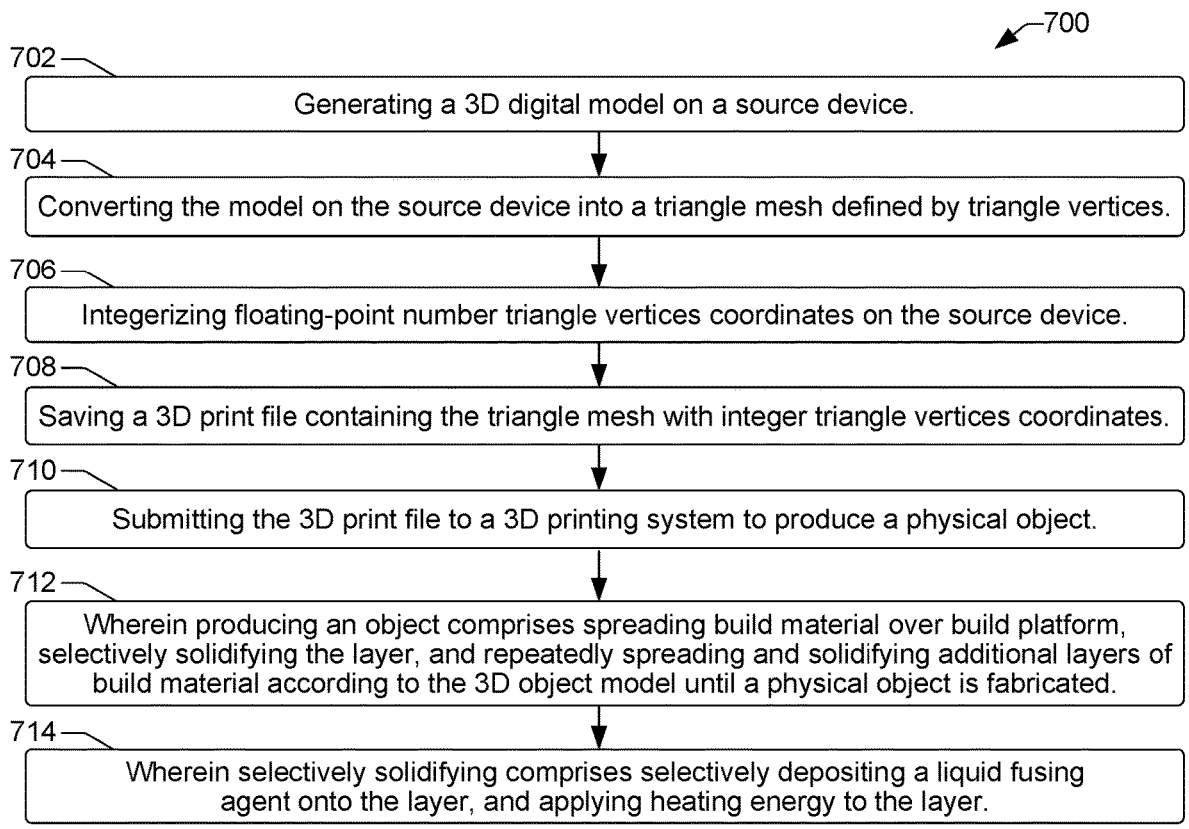
FIG. 7 is a flow diagram showing an example method of preparing a 3D digital object model for printing on a 3D printing system; and, FIG. 8 shows a block diagram of an example additive manufacturing system implemented as a 3D printing system.

The methods 500, 600, and 700 may include more than one implementation, and different implementations of methods 500, 600, and 700 may not employ every operation presented in the respective flow diagrams of FIGS. 5, 6 and 7. Therefore, while the operations of methods 500, 600, and 700 are presented in a particular order within their respective flow diagrams, the order of their presentations is not intended to be a limitation as to the order in which the operations may actually be implemented, or as to whether all of the operations may be implemented. For example, one implementation of method 500 might be achieved through the performance of a number of initial operations, without performing other subsequent operations, while another implementation of method 500 might be achieved through the performance of all of the operations.

Referring now to the flow diagram of FIG. 5 (i.e., FIGS. 5a, 5b), starting at FIG. 5a, an example method 500 of submitting 3D object models to a 3D printing system begins at block 502 with receiving a digital object model as a triangle mesh. The digital object model represents a 3D object to be produced by a 3D printing system or other additive manufacturing system. The method also includes integerizing the floating-point X, Y, Z, coordinate values of triangle vertices that define the triangles of the triangle mesh (block 504). The method includes storing the digital object model in a 3D print file as an integerized triangle mesh that comprises the integerized X, Y, Z, coordinate values (block 506), and then submitting the 3D print file with the integerized triangle mesh to the 3D printing system to produce the 3D object (block 508). Storing the digital object model in a 3D print file can include storing the digital object model in a 3MF file, an STL file, and other files with suitable file formats. Integerizing the floating-point values comprises rounding the values to a nearest integer value (block 510). In some example, the method includes mapping a space of the digital object model triangle mesh to an origin of the 3D printing system before submitting the 3D print file to the 3D printing system (block 512). The mapping can include computing a translation based on a minimum value of the triangle vertices, and subtracting the translation from each triangle vertex (block 514). The method 500 continues at FIG. 5b where in some examples the mapping includes translating an origin of a bounding box that encompasses the digital object model to a build origin of the 3D printing system (block 516). The method can also include, the 3D printing system translating integerized triangle vertices coordinates to points on a 3D grid within a build volume of the 3D printing system in a voxelization operation (block 518).

Referring now to the flow diagram of FIG. 6, an example method 600 of producing a 3D print file for submission to a 3D printing system begins at block 602 with receiving a digital object model from a 3D object model source. The method continues with transforming the digital object model into a mesh of triangles defined by triangle vertices X, Y, Z, coordinates expressed as floating-point numbers (block 604), and integerizing the floating-point numbers before submitting the mesh of triangles to a 3D printing system (block 606). Integerizing the floating-point numbers comprises rounding the floating-point numbers to a nearest integer to reduce the number of digits used to express the triangle vertices X, Y, Z, coordinates (block 610). The method then includes saving integerized triangle vertices X, Y, Z, coordinates in a 3D print file so that the digital object model is represented as a mesh of triangles defined by integerized triangle vertices X, Y, Z, coordinates expressed as integer numbers (block 608), and submitting the 3D print file to a 3D printing system after saving the integerized triangle vertices X, Y, Z, coordinates in the 3D print file (block 612). The method can also include translating the integerized triangle vertices X, Y, Z, coordinates to corresponding positions within a 3D coordinate space relative to the 3D printing system's origin (block 614).

Referring now to the flow diagram of FIG. 7, a method 700 of preparing a 3D digital object begins at block 702 with generating a 3D digital model on a source device. A source device can include, for example, a scanner or a CAD system. The 3D digital model can then be converted on the source device into a triangle mesh where the triangles of the mesh are defined by triangle vertices (block 704). The source device can then integerize the triangle vertices coordinates that are initially generated and represented as floating-point numbers (block 706). Integerization comprises rounding the floating-point numbers to their nearest integer value, which effectively removes the digits to the right of the decimal point from each floating-point number. The source device can then save a 3D print file that contains the triangle mesh with the integer triangle vertices coordinates (block 708). The 3D print file can be saved, for example, as a 3MF or STL file to be used later by an additive manufacturing system such as a 3D printing system.

In some examples, the method 700 can continue with submitting the 3D print file to a 3D printing system to control production of a physical object based on the 3D digital object model (block 710). Controlling production of a physical object on a 3D printing system can include spreading a layer of build material over a build platform of a 3D printer, selectively solidifying a portion of the layer according to the 3D object model, and repeatedly spreading and solidifying additional layers of build material according to the 3D object model until a physical object is fabricated (block 712). Selectively solidifying a portion of a layer includes selectively depositing a liquid fusing agent onto the layer and applying heating energy to the layer (714).

Figure 8:
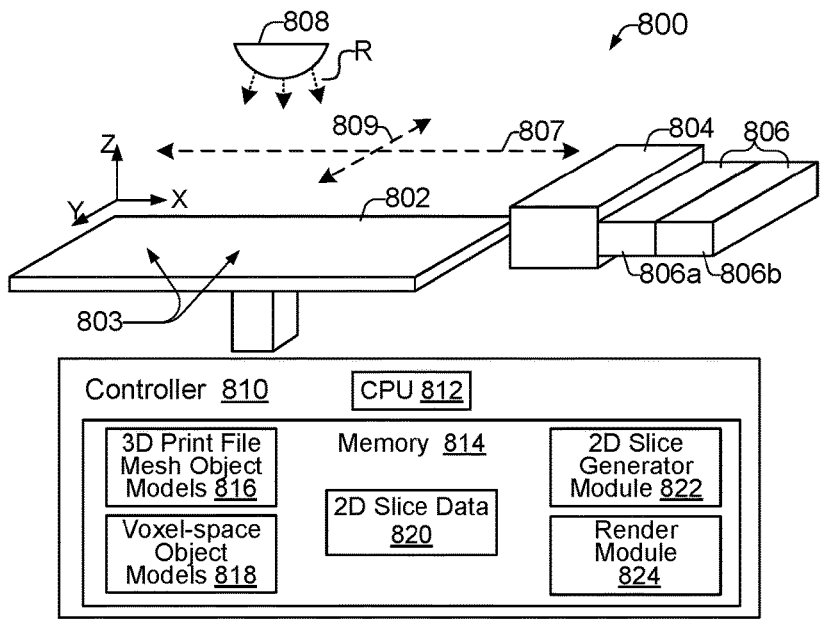

FIG. 8 shows a block diagram of an example additive manufacturing system implemented as a 3D printing system 800. A 3D printing system 800 is suitable for receiving a 3D print file containing triangle meshes representing digital 3D object files for producing as physical objects. The 3D printing system 800 is shown by way of example, and is not intended to represent a complete 3D printing system. Thus, it is understood that an example system 800 may comprise additional components and may perform additional functions not specifically illustrated or discussed herein.

An example 3D printing system 800 includes a moveable print bed 802, or build platform 802 to serve as the floor to a work space or build volume/area 803 in which 3D objects can be printed. In some examples the print bed 802 can move in a vertical direction (i.e., up and down) in the Z-axis direction. The build volume 803 of a 3D printing system generally refers to a volumetric work space that develops above the moveable print bed 802 as the print bed moves vertically downward during the layer-by-layer printing and solidification of each layer of a 3D object. This work space can be alternately referred to herein as a build volume, a build area, a work space, and the like. In some examples, the build volume 803 can be subdivided into subvolumes as discussed in more detail below. An example 3D printing system 800 also includes a powdered build material distributor 804 that can provide a layer of powder over the print bed 802. The powder distributor 804 can include a powder supply and powder spreading mechanism such as a roller or blade to move across the print bed 802 in the X-axis direction to spread a layer of powder.

A liquid agent dispenser 806 can deliver a liquid functional agent such as a fusing agent and/or detailing agent from a fusing agent dispenser 806a and detailing agent dispenser 806b, respectively, in a selective manner onto areas of a powder layer provided on the print bed 802. Liquid agent dispensers 806 can include, for example, a printhead or printheads, such as thermal inkjet or piezoelectric inkjet printheads. In some examples, a printhead dispenser 806 can comprise a page-wide array of liquid ejectors (i.e., nozzles) that spans across the full Y-axis dimension of the print bed 802 and moves bi-directionally (i.e., back and forth) in the X-axis as indicated by direction arrow 807 while it ejects liquid droplets onto a powder layer spread over the print bed 802. In other examples, a printhead dispenser 806 can comprise a scanning type printhead. A scanning type printhead can span across a limited portion or swath of the print bed 802 in the Y-axis dimension as it moves bi-directionally in the X-axis as indicated by direction arrow 807, while ejecting liquid droplets onto a powder layer spread over the print bed 802. Upon completing each swath, a scanning type printhead can move in the Y-axis direction as indicated by direction arrow 809 in preparation for printing another swath of the powder layer on print bed 802.

The example 3D printing system 800 also includes a fusing energy source 808, such as radiation source 808, that can apply radiation R to powder layers on the print bed 802 to facilitate the heating and fusing of the powder. In some examples, the energy source 808 can comprise a scanning energy source that scans across the print bed 802 in the X-axis direction. In some examples, where a 3D printing system comprises a binder jetting system that can print a liquid binder agent onto different materials such as metals, ceramics, and plastics, for example, the system 800 can include a binder agent drying/curing unit (not shown).

Referring still to FIG. 8, an example 3D printing system 800 additionally includes an example controller 810. The example controller 810 can control various components and operations of the 3D printing system 800 to facilitate the printing of 3D objects according to triangle mesh 3D digital object models contained within 3D print files as generally described herein. Such control includes controllably spreading powder onto the print bed 802, selectively applying/printing fusing agent and detailing agent to portions of the powder, and exposing the powder to radiation R.

As shown in FIG. 8, an example controller 810 can include a processor (CPU) 812 and a memory 814. The controller 810 may additionally include other electronics (not shown) for communicating with and controlling components of the 3D printing system 800. Such other electronics can include, for example, discrete electronic components and/or an ASIC (application specific integrated circuit). Memory 814 can include both volatile (i.e., RAM) and nonvolatile memory components (e.g., ROM, hard disk, optical disc, CD-ROM, flash memory, etc.). The components of memory 814 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 812 of the 3D printing system 800. Examples of data that can be received and/or generated by the controller 810 and stored in memory 814, include triangle mesh 3D object model data contained within a 3D print file 816, voxel-space object model data 818, and 2D slice data 820. Examples of executable instructions that can be stored in memory 814 include instructions associated with modules 822 and 824.

A 3D printing system 800 can receive or otherwise access digital 3D object model triangle meshes contained within a 3D print file 816 that represent objects to be printed. In different examples, voxel-space object models 818 can be received directly by the system 800, or they can be received as digital 3D object model triangle meshes 816 in another format such as 3MF and then converted by the processor 812 into a voxel-space object model 818 format. The voxel-space object model 818 can include geometric information that describes the shape of the 3D object, as well as information indicating colors, surface textures, build material types, the position for printing the 3D object within the build volume 803, and so on. The processor 812 can execute instructions from 2D slice generator module 822 to generate the 2D slice data 820. The processor 812 can then further execute instructions from the render module 824 to generate 3D print system commands that can control the operation of components of the 3D printing system 800 in order to print layers of a 3D object corresponding with the 2D slice data 820.

What is claimed is:

1. A method of submitting 3D object models to a 3D printing system comprising:
   receiving a digital object model as a triangle mesh, the digital object model representing a 3D object to be produced by a 3D printing system;
   mapping a space of the digital object triangle mesh to an origin of the 3D printing system;
   after mapping the space of the digital object triangle mesh to the origin of the 3D printing system, integerizing floating-point X, Y, Z, coordinate values of triangle vertices that define triangles of the triangle mesh;
   storing the digital object model in a 3D print file as an integerized triangle mesh comprising the integerized X, Y, Z, coordinate values; and,
   submitting the 3D print file with the integerized triangle mesh to the 3D printing system to produce the 3D object.

2. The method as in claim 1, wherein integerizing comprises rounding floating-point coordinate values to a nearest integer value.

3. The method as in claim 1, wherein mapping comprises:
   computing a translation based on a minimum value of the triangle vertices; and,
   subtracting the translation from each triangle vertex.

4. The method as in claim 1, wherein mapping comprises translating an origin of a bounding box that encompasses the digital object model to a build origin of the 3D printing system.

5. The method as in claim 1, further comprising:
   on the 3D printing system, translating integerized triangle vertices coordinates to points on a 3D grid within a build volume of the 3D printing system in a voxelization operation.

6. The method as in claim 1, wherein storing the digital object model in a 3D print file comprises storing the digital object model in a 3MF file.

7. A method comprising:
   receiving a digital object model from a 3D object model source;
   transforming the digital object model into a mesh of triangles defined by triangle vertices X, Y, Z, coordinates expressed as floating-point numbers;
   before submitting the mesh of triangles to a 3D printing system, translating the triangle vertices X, Y, Z, coordinates to corresponding positions within a 3D coordinate space relative to an origin of a 3D printing system's origin, and then integerizing the translated triangle vertices X, Y, Z, coordinates by integerizing the floating-point numbers;
   saving the integerized translated triangle vertices X, Y, Z, coordinates in a 3D print file so that the digital object model is represented as a mesh of triangles defined by the integerized translated triangle vertices X, Y, Z, coordinates expressed as integer number; and
   submitting the 3D print file to a 3D printing system after saving the integerized translated triangle vertices X, Y, Z, coordinates in the 3D print file, to cause the 3D printing system to generate an object corresponding to the digital object model.

8. The method as in claim 7, wherein integerizing the floating-point numbers comprises rounding the floating-point numbers to a nearest integer to reduce a number of digits used to express the triangle vertices X, Y, Z, coordinates.

9. A method comprising:
   generating a 3D digital model for an object, on a source device;
   converting the 3D digital model on the source device into a triangle mesh defined by triangle vertices having coordinates represented in floating-point numbers;
   translating the coordinates of the triangle vertices to corresponding positions within a 3D coordinate space relative to an origin of a 3D printing system that is to physically generate the object;
   integerizing, on the source device, the translated coordinates of the triangle vertices by integerizing the floating-point numbers of the translated coordinates;
   saving, by the source device, a 3D print file that contains the triangle mesh with the integerized translated coordinates of the triangle vertices; and
   submitting the 3D print file to the 3D printing system to physically generate the object.

10. The method as in claim 9, wherein submission of the 3D print file to the 3D printing system controls production of the object based on the 3D digital object model.

11. The method as in claim 10, wherein the production of the object comprises:
spreading a layer of build material over a build platform of a 3D printer of the 3D printing system;
selectively solidifying a portion of the layer according to the 3D object model; and
repeatedly spreading and solidifying additional layers of build material according to the 3D object model until the object is fabricated.

12. The method as in claim 11, wherein selectively solidifying comprises:
selectively depositing a liquid fusing agent onto the layer; and
applying heating energy to the layer.

* * * * *